3,072,019
SADDLE CART AND LOADER CHAIN FOR
GUIDED MISSILE LAUNCHING SYSTEM
Richard C. Wilson, Champlin, Minn., and Robert E. Carlberg, McLean, Va., assignors, by direct and mesne assignments, to the United States of America as represented by the Secretary of the Navy
Filed June 14, 1960, Ser. No. 36,098
14 Claims. (Cl. 89—1.7)

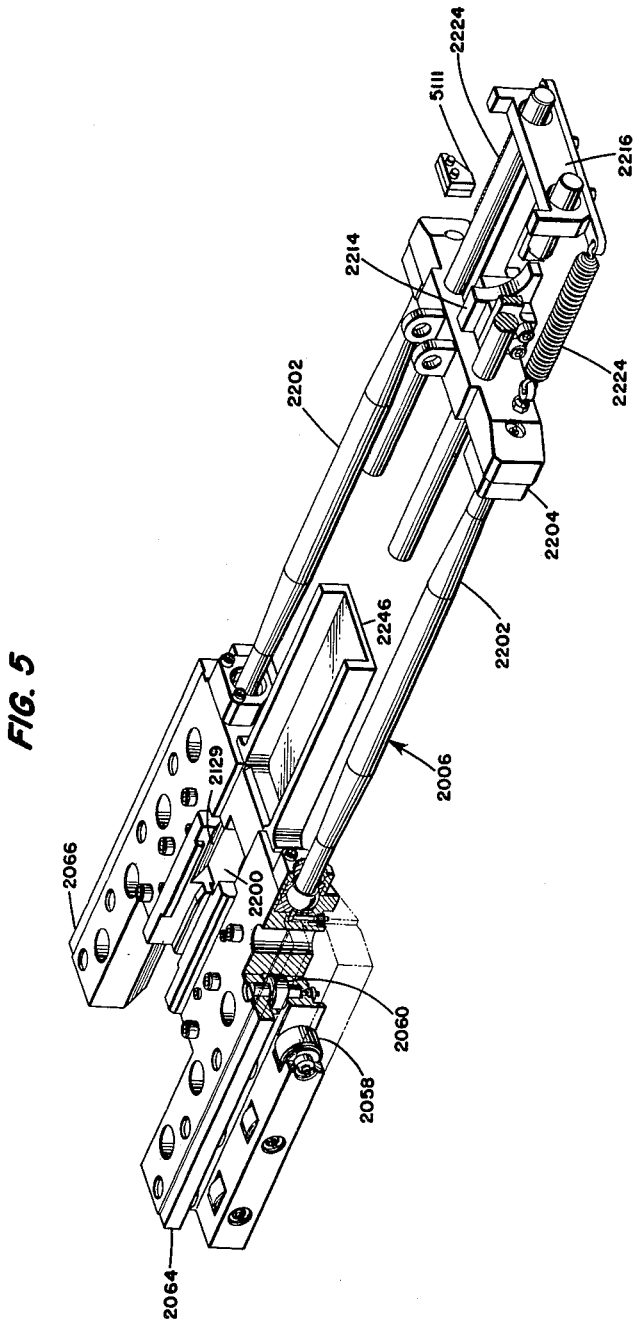

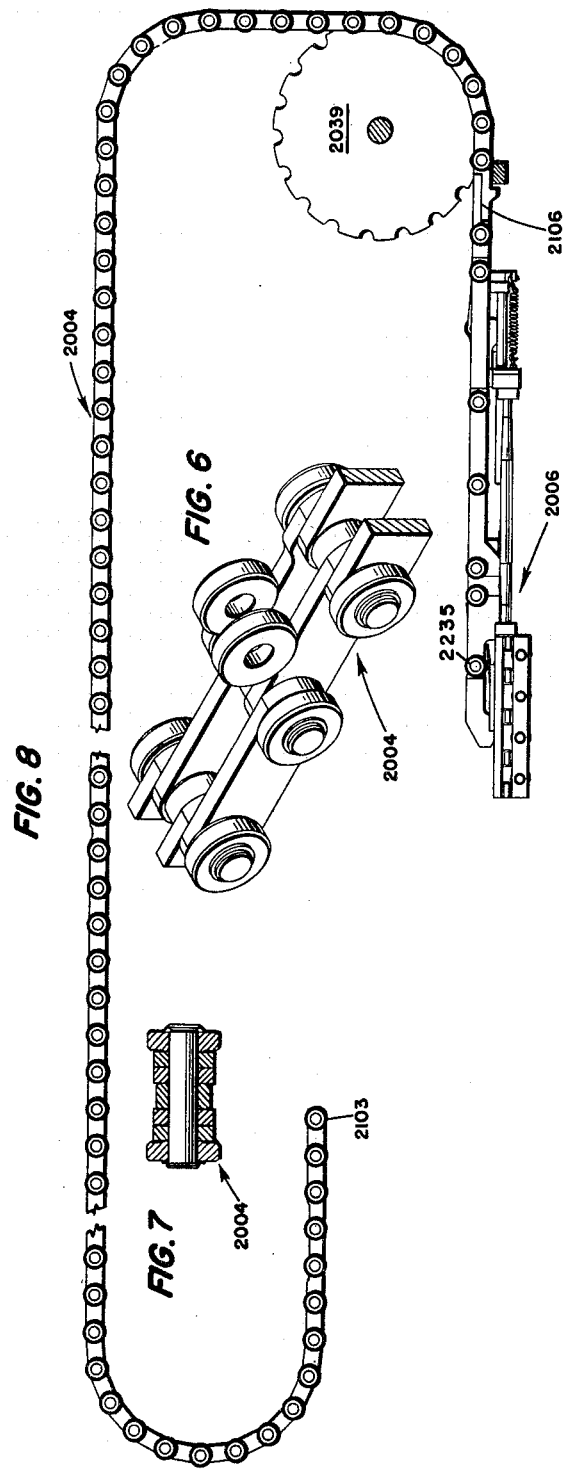

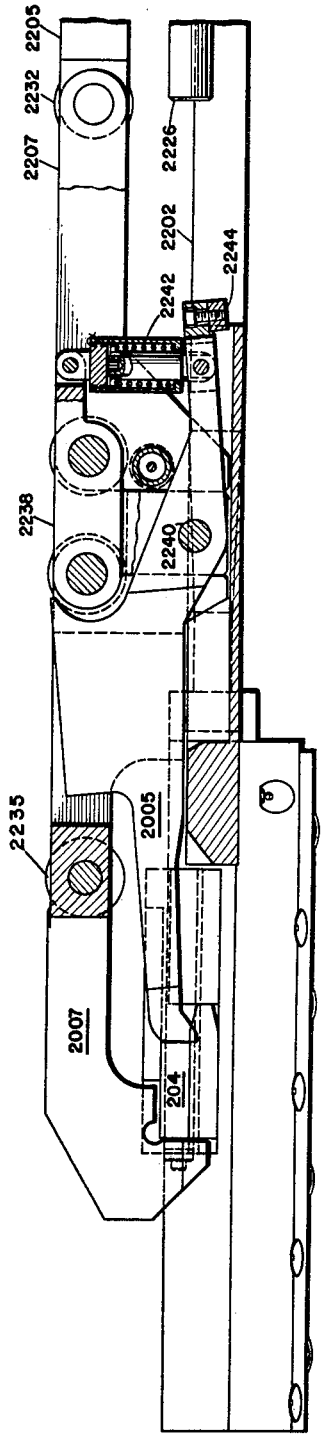
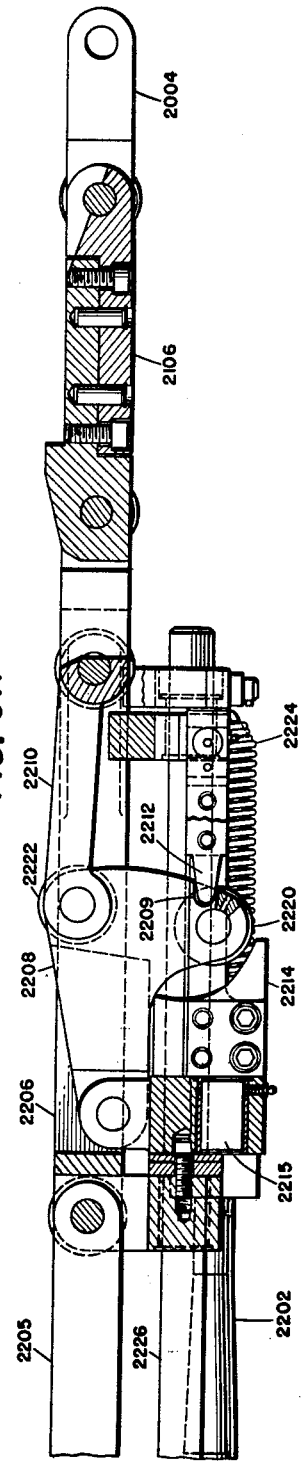
FIG. 9
FIG. 9A

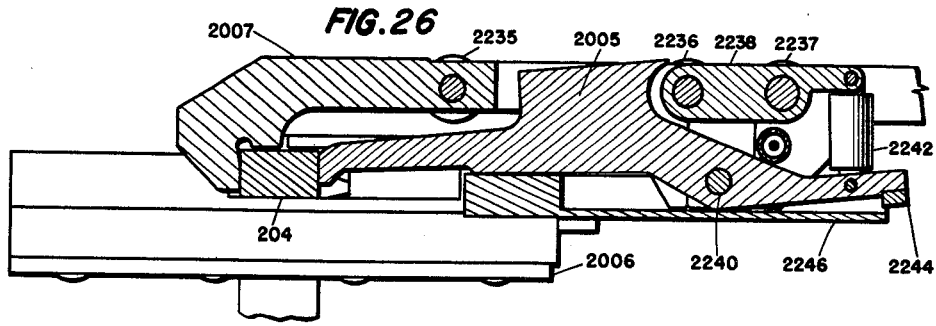
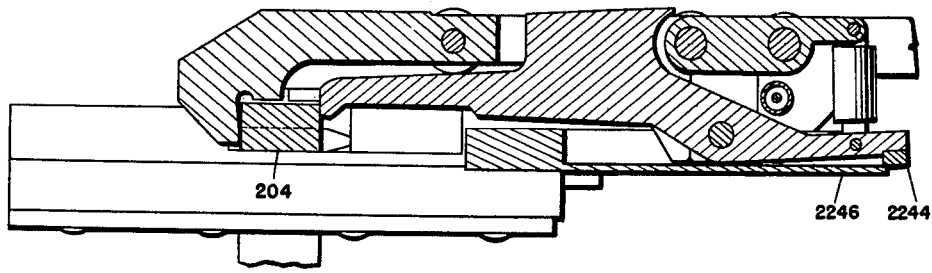
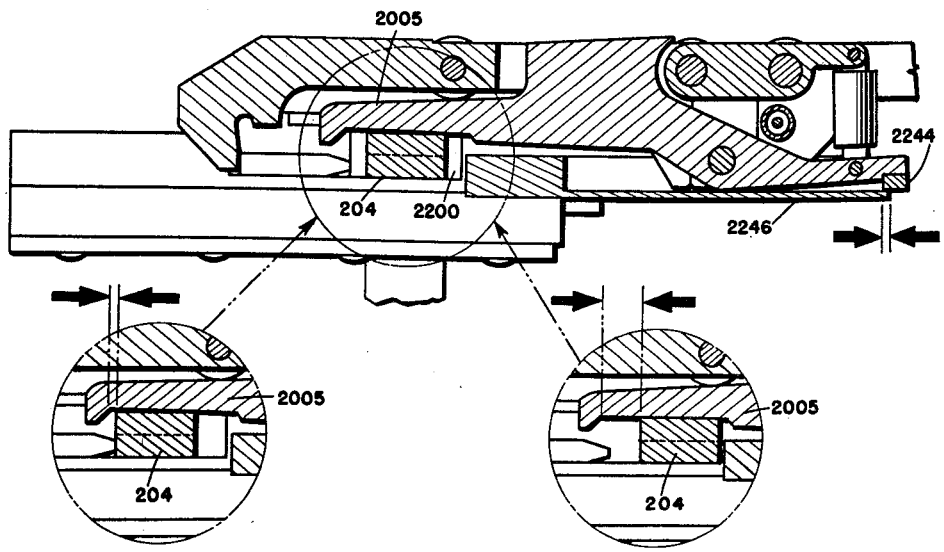

This invention relates generally to conveyers, and more particularly it pertains to a skid supported saddle cart for transporting ordnance weapons. The saddle cart and loader chain of the present invention are a part of a guided missile launching system described in a copending U.S. patent application Serial Number 848,163 entitled "Guided Missile Launching System," filed on October 22, 1959, by Myron J. Bauer et al. and assigned to the United State Government.

Ordnance weapons, to which the invention relates are provided with so-called forward and aft lugs or shoes longitudinally spaced and suitably disposed for engagement by conveying equipment. The cross sections or profiles of the separated shoes are of necessity dissimilar.

The saddle cart of this invention may be generally described as a vehicle adapted for travel along an overhead tramway or trunk. It consists of a roller-equipped carriage or cart which is linked and joined by tie rods to a cross-head. The chain and cart are engaged to and driven by a rotary power drive stationarily located at one end of the tramway.

The carriage is provided with a receptacle which is intended to receive the aft handling lug of a missile weapon to offer a degree of vertical and lateral support. Forward and aft surfaces of the same lug are engaged by a pawl arrangement which is also linked to the chain and rotary power drive for longitudinal transfer of the weapon. The pawl and connecting link arrangement through a toggle action forces the aft weapon lug into a seated position in the carriage and the forward weapon lug onto the skid track of the trunk. The pawl with other portions of the link arrangement performs a deceleration, positioning and holding function pending further disposition of the weapon after the saddle cart transports the missile weapon to the extended end of the tramway.

It is necessary to stop and secure the position of the cart while the weapon is transferred forward from support on the cart to a suitable receptacle located at the extended end of the tramway. Accordingly an arrangement is provided to buckle auxiliary articulated links, coupling the cart to the chain, to allow the terminal motion of the cart to be absorbed.

It is a primary objective of this invention, therefore, to provide a pawl arrangement for engaging a lugged article such as an ordnance missile weapon for transport of said article on a tramway, whereby said article and pawl are suitably attached to and propelled by a drive member stationarily located at one end of said tramway, whereby the remote opposite end of said tramway is fitted with a receptacle for receiving said lug of said article, and whereby said pawl arrangement precisely positions and rigidly holds said lug in said receptacle for further disposition independent of further forward motion or ultimate stopping position of said drive member.

It is a further objective of this invention to provide a receptacle vehicle for transporting lugged articles, such as a missile weapon, on a tramway, whereby said vehicle is adapted to engage a lug of said article, whereby said vehicle is further adapted to engage skid tracks or guide rails appropriately spaced and attached to said tramway, and whereby said tracks are primarily intended to engage and support a second lug of said article which is longitudinally spaced and of dissimilar configuration from first said lug.

Another objective of this invention is to provide a receptacle vehicle for transporting lugged articles, such as a missile weapon on a tramway whereby said vehicle is also provided with a lug grasping and seating pawl arrangement for receiving and transferring engagement of said lug to said vehicle.

Another objective of this invention is to provide a receptacle vehicle for transporting lugged articles, such as a missile weapon, on a tramway whereby said vehicle is also provided with a lug grasping and seating pawl arrangement for receiving and transferring engagement of said lug to said vehicle; whereby said pawl arrangement is further utilized to transfer engagement of said lug from said vehicle to a second receptacle located at the remote end of said tramway; and whereby said lug is precisely positioned and rigidly held by said pawl arrangement for further disposition.

Another objective of this invention is to provide a receptacle vehicle for transporting lugged articles, such as a missile weapon, on a tramway whereby said vehicle and said article are suitably attached to and propelled by a drive member in a manner such that forward motion of said vehicle is ultimately arrested and the position of said vehicle is rigidly held independent of continued further forward motion of said drive member and engaged article.

Still another objective of this invention is to provide a receptacle vehicle for receiving lugged articles, such as a missile weapon, whereby said vehicle is allowed to flex or transversely align to the position of said lug for subsequent longitudinal engagement.

And yet another objective of this invention is to provide a receptacle vehicle for transporting lugged articles between separated stations on a tramway whereby said vehicle is also provided with a lug grasping and seating pawl arrangement, and whereby said lug grasping arrangement is further provided with a safety device that will prevent undesirable release of said lug.

In accordance with the invention, there is provided a loader chain to transfer a saddle cart, once the latter has engaged the aft shoe of a booster, of a missile-booster combination, forward to the guide arm of a launcher in a loading operation of a weapon and back again for either a reloading of a missile-booster combination in Area 2 (an area where missile-booster combinations are stored in a ship without aerodynamic surfaces and arming mechanisms) or the return of a weapon from the launcher to Area 1 (an area located between Area 2 and the launcher for assembly of aerodynamic surfaces to the missiles and boosters to form missile weapons and preflight warmup thereof).

The loader chain is powered by a chain power drive which is attached to a sprocket in a track housing at a trunk section in Area 2. The loader chain travels the distance of the loader chain track at a speed of twelve feet per second in normal automatic operation.

The loader chain is made up of 275 links, three and one half inches wide, with a four inch pitch and is attached to the saddle cart. When the saddle cart is located in a load position in Area 2, the free end of the loader chain is contained in the chain stowage track which extends aft into Area 1 where it bends back short of a loader warmup contactor and hence forward into Area 2.

The edges of some of the chain links have cutouts, which are used as cam surfaces functioning as an important part of the hydraulic and electric interlock circuits.

Cam rollers, coupled with valves and switches, indicate when the saddle cart is located in either Area 1 or Area 2.

A special coupling link is located between the saddle cart and the loader chain to allow these two components to be disconnected for shipboard installation and servicing. This coupling link also moves against a positive stop when the saddle cart is retracted beyond the normal stopping position in Area 2.

The saddle cart is a moving assembly which is designed to glide along skid tracks of the loader track in Area 1 and Area 2 of the loader. This saddle cart is attached to and pulled by the loader chain by means of the coupling link.

In a normal stowed and load position, the saddle cart rests flush with the forward end of trunk section I of the loader. The saddle cart is perfectly aligned with the aft floating track. The saddle cart, with guide rollers, give vertical and lateral support to the missile-booster combination during its transfer from a ready service mechanism of Area 2 to a wing and fin assembly compartment of Area 1. The forward and aft surfaces of the aft booster shoe are engaged by the forward motion pawl and the reverse or aft motion pawl of the saddle cart. All longitudinal transfer of force is the result of contact between the surfaces of the booster shoe and the pawls.

Once the desired missile-booster combination, that is a standard S-type missile, or an atomic W-type missile has been positioned in a center ready service tray of the ready service mechanism and raised by the ready service center hoists thereof to a point just below the loader track of the trunk sections in Area 2, the aft and forward floating tracks are engaged by the aft and forward shoes of the booster, respectively.

The vertical distance that the floating tracks are lifted is only about three-fourths of an inch at the forward floating track and one-half of an inch at the aft floating track. A rammer then forces the pawls of the saddle cart to engage the aft booster shoe by retracting. Once the aft and forward shoes of the booster are engaged with the skid tracks of the loader track and an indication is given by a shoe engagement indicator, the rammer extends and rams the entire missile-booster combination forward approximately four inches.

The missile-booster combination is then raised to where the saddle cart is aligned to the skid tracks along with the forward booster shoe. The missile-booster combination is then ready to be transferred into Area 1 for assembly of the wings, and fins thereto to form weapons.

When the aft booster shoe enters a receptacle of the saddle cart and is approximately four inches aft of the position of the saddle cart, a reverse motion pawl is lifted and sits on the top surface of the aft booster shoe. Forward and reverse motion pawls must be retracted until the reverse motion pawl has passed topside of the aft booster shoe and dropped to engage the aft surface of the shoe. The ramming of the missile-booster combination by the rammer then takes place.

Several sets of chain links are required to move the forward and reverse motion pawls along with the saddle cart since both elements are attached to the loader chain. For ease of understanding, the various links and joints of the saddle cart are analogous to the anatomy of the human leg.

The saddle cart is connected to a tie rod crosshead by two identical tie rods. The saddle cart receptacle for receiving the aft shoe of the booster is positioned at the open end of the saddle cart. The coupling link, which secures the saddle cart to the loader chain, is located to the rear of the crosshead assembly. The forward and reverse motion pawls fit between the tie rods and extend fore and aft of the whole assembly of the saddle cart.

During the ramming by the rammer of the missile-booster combination, the tie rod crosshead holds the saddle cart rigidly to a hip link through an auxiliary leg link and an auxiliary thigh link. These links may also collapse, but only when the weapon is loaded to the guide arm of the launcher.

The auxiliary leg and thigh links are locked in place by a knee latch until the saddle cart reaches the end of travel on the guide arm of the launcher. The knee latch projects from the frame support of a floating cam. It is spring-loaded to engage a notch in the auxiliary leg link.

Once the saddle cart is stopped, the weapon is transferred to the guide arm of the launcher. Through the pawl engagement, the loader chain must force the weapon from the saddle cart to engage the aft shoe latching mechanism on the guide arm.

When the cart is at a point one and one-third inches from stop, a guide bar of a floating cam of the saddle cart contacts a stopping bar on the guide arm of the launcher. During the next five-sixteenth inches of travel, the knee latch disengages the auxiliary leg link from its locked position. The auxiliary leg and thigh links buckle (or collapse) at an auxiliary knee joint and the loader chain and pawls continue forward to complete the loading cycle.

These objects and other advantages of this invention will become more readily apparent from the following detailed description and accompanying drawings in which:

FIG. 5 is a dimetric view of the lower components of the saddle cart;

FIG. 6 is a dimetric view of a loader chain assembly;

FIG. 7 is a typical section taken through a chain link;

FIG. 8 is a side elevation of the loader chain and saddle cart therefor;

FIG. 9 is a vertical sectional view of the saddle cart, chain pawls, and linkage arrangement therefor;

FIG. 9A is a continuation to the right of FIG. 9;

FIG. 26 is a side elevation, partly in cross section, illustrating the engagement of the aft booster shoe of booster to saddle cart, with the saddle cart being in normal loaded position;

FIG. 27 is a view similar to FIG. 26, with the safety stop limiting pawl lift;

FIG. 28 is a view similar to FIGS. 26 and 27, showing aft booster shoe in nominal position before ramming, with left or right inserts showing minimum and maximum tolerances, respectively;

Figure 1:
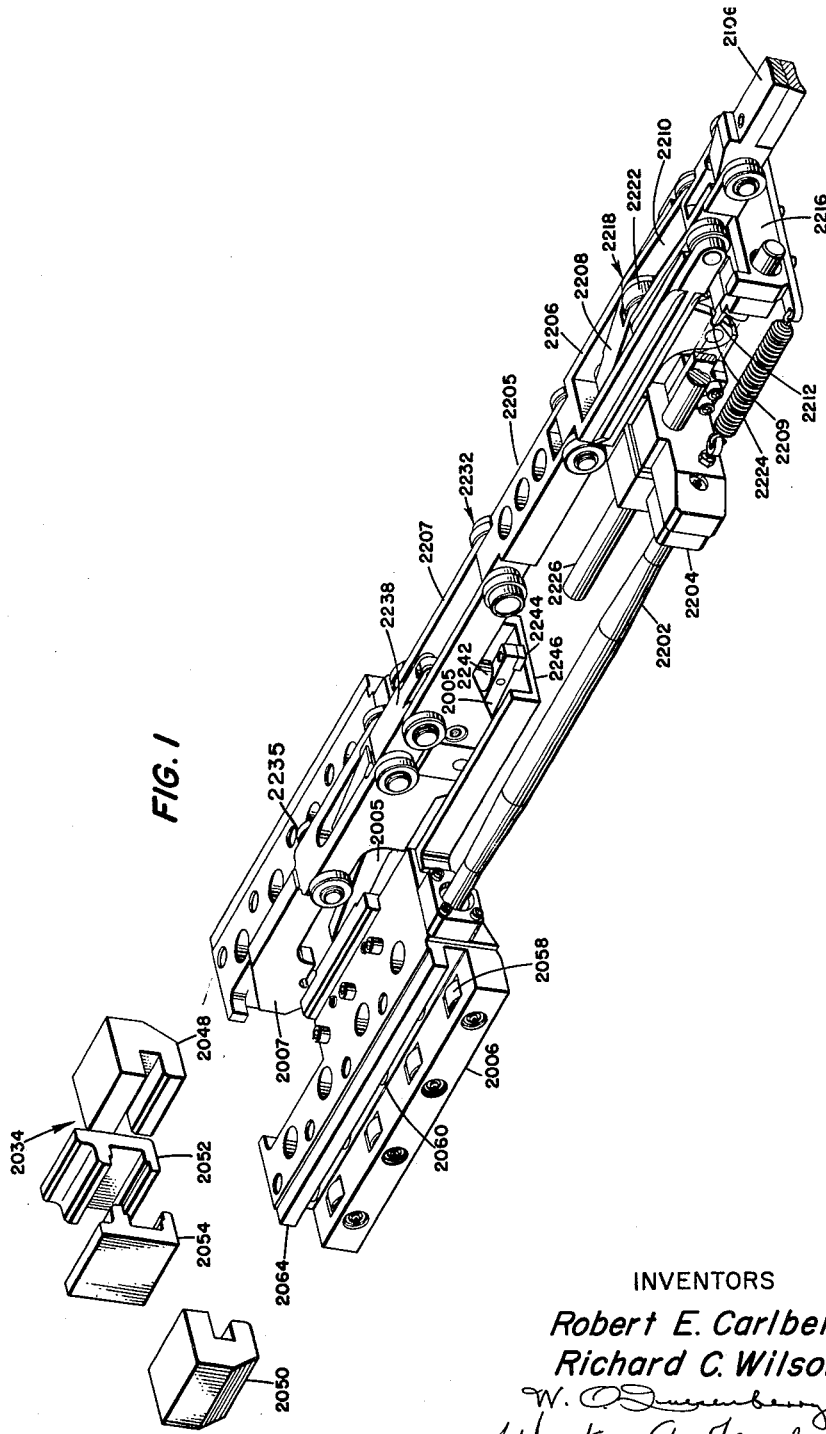
FIG. 1 is a dimetric view of a saddle cart and a pawl arrangement showing relationship to a loader chain and skid tracks.

Referring now to FIG. 1, there is shown therein a saddle cart 2006. The saddle cart 2006 is a moving assembly which is designed to glide along a pair of skid tracks 2048 and 2050 of an overhead conveyor loader track 2034. This saddle cart 2006 is attached to and pushed or pulled by a loader chain 2004 secured to a coupling link 2106.

Figure 2:
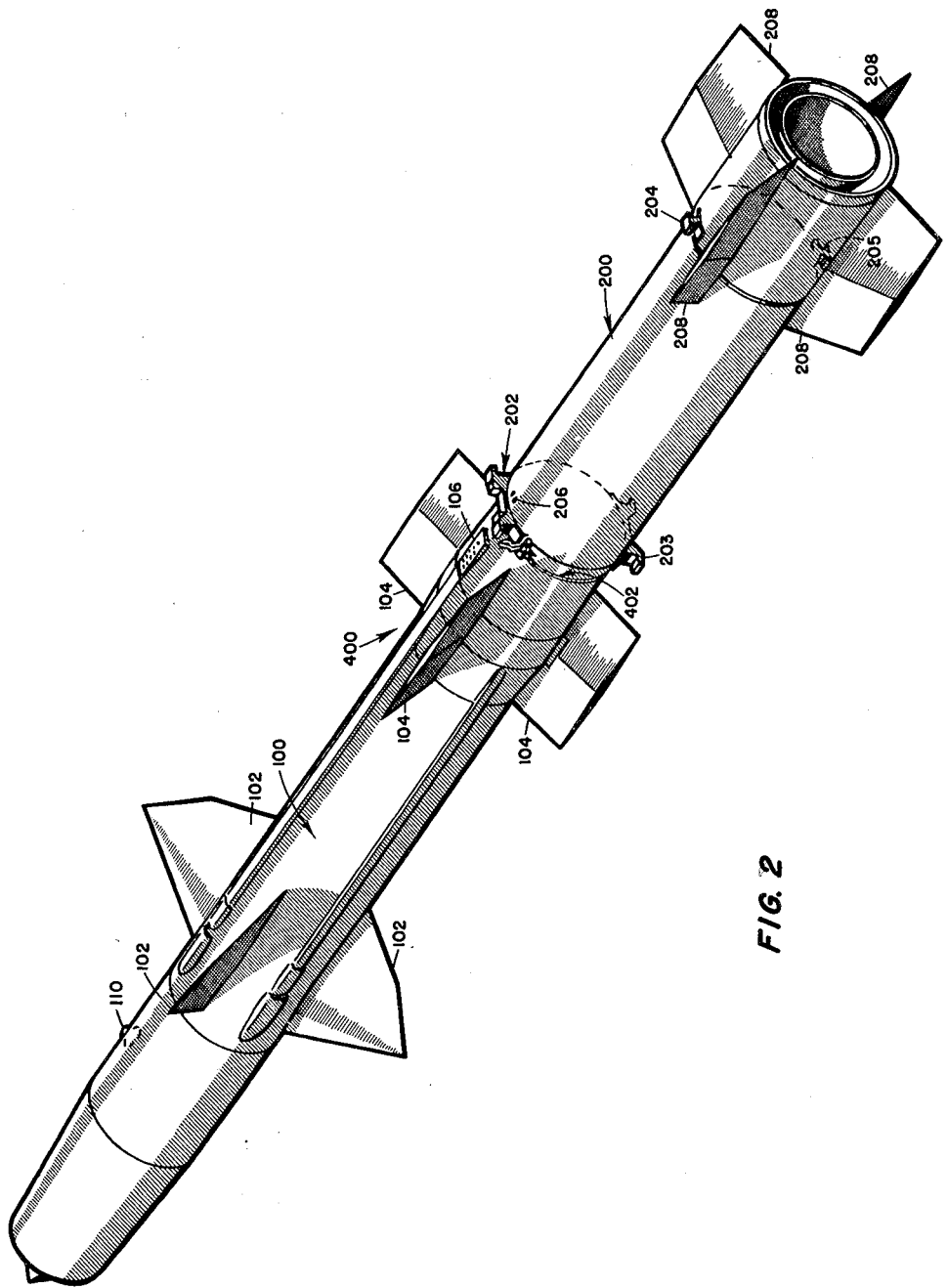
FIG. 2 is a perspective view of a missile weapon showing handling lugs.

A typical ordnance article transported by the saddle cart is a weapon 400, illustrated in FIG. 2. Without wings 102 and fins 104 for a missile 100 and fins 208 for a booster 200, this weapon 400 is stored in a ready service mechanism (Area 2) as a missile-booster combination 300.

The missile-booster combination 300 is clamped together with a clamping ring 402. The missile 100 is provided with a warhead arming mechanism 110, a warmup contact pad 106, while the booster 200 is provided with an arming mechanism 206.

The supporting and horizontal transportation of the missile-booster combination 300 is with a pair of upper forward and aft booster shoes 202 and 204, respectively. In addition, the booster is provided with lower forward and aft handling shoes 203 and 205, respectively, for use in the ready service mechanism of Area 2.

The forward booster shoe 202 is provided with a broad wheel base for vertical support and lateral stability of the missile-booster combination 300 as it slides along the skid tracks 2048 and 2050. The aft shoe 204 of the booster 200 gives little support in this manner but all longitudinal transfer of the missile-booster combination 300 is through engagement therewith.

Figure 3:
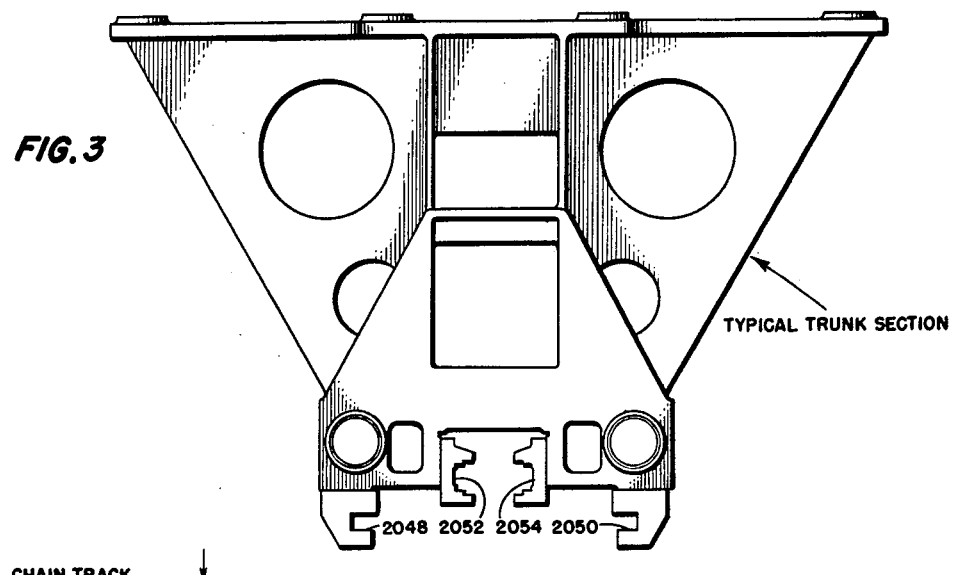
FIG. 3 is an end view of a typical trunk section.
Figure 4:
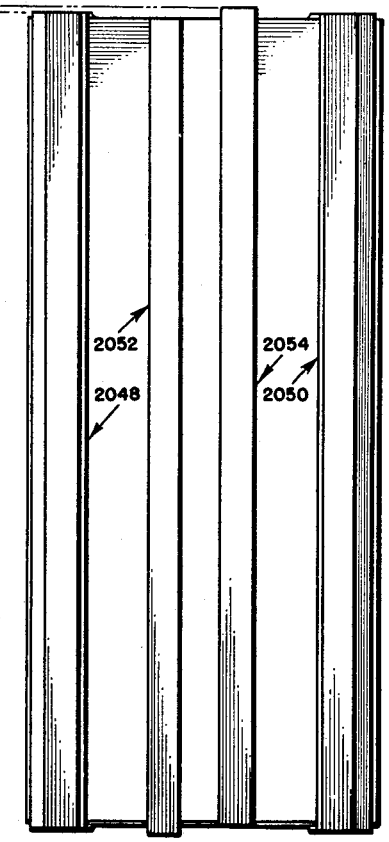
FIG. 4 is a bottom view of a typical trunk section, such as shown in FIG. 3.

FIGS. 3 and 4 show how a typical trunk section of an overhead conveyer is provided with the skid tracks 2048 and 2050 and a pair of chain tracks 2052 and 2054. Rather than provide separate skid tracks for the narrow aft shoe 204, the saddle cart 2006 is used to support the aft shoe 204. This saddle cart 2006, in turn, is guided by the skid tracks 2048 and 2050 provided for the forward booster shoe 202.

Horizontal guide rollers 2060, shown best in FIG. 5, give the saddle cart 2006 lateral stability with vertical rollers 2058 being provided for contacting the bottom surfaces of the skid tracks 2048 and 2050 to give roller support to the saddle cart 2006 only when there is a vertical load from the bottom.

The center of gravity of the missile-booster combination 300 is forward of the forward booster shoe 202. The missile-booster combination 300, cantilevered in this manner, causes the load at the upper aft shoe 204 to be upward and not downward. When the saddle cart 2006 travels empty, it is supported only by skid lugs 2064 and 2066, shown best in FIG. 5.

The missile-booster combinations 300 brought from storage in the ready service mechanism are handled while supported in individual trays. The trays are designed to retain the pair of lower forward and aft booster shoes 203 and 205, respectively, shown in FIG. 2. To disengage the booster shoes 203 and 205 from the handling tray, the missile-booster combination 300 must be rammed forward a nominal amount of approximately four (4) inches. In this same forward movement, the upper booster shoes 202 and 204 engage the loader skid tracks 2048 and 2050 and the saddle cart 2006, respectively, with the same four (4) inch ram stroke. After this ramming, equipment on the loader trunk lifts the missile-booster combination 300 a short distance for final lateral alignment with the tracks 2048 and 2050. A receptacle 2200 having a tapered lead-in slot 2129 for the aft shoe 204 of the missile-booster combination 300 is shown in the shaddle cart 2006 of FIG. 5. The ramming motion against the aft shoe 204 as well as the fore and aft thrusts involved in conveying the missile-booster combination 300 along the tracks 2048 and 2050 is applied by a reverse motion pawl 2005 and a forward motion pawl 2007, shown in FIG. 1.

Figure 22:
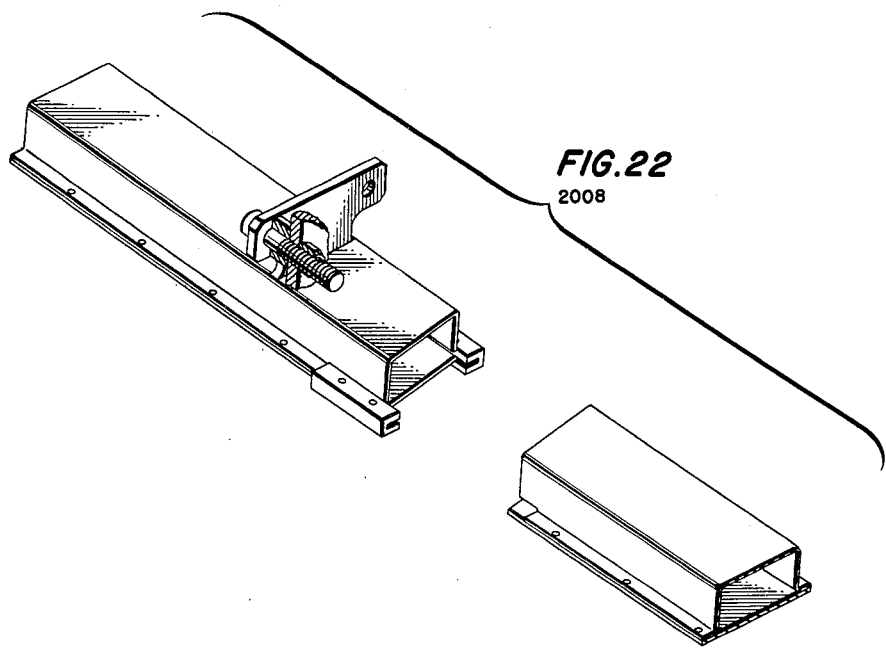
FIG. 22 is a dimetric view of a typical joint and mounting for the sections of loader chain stowage track.

The loader chain 2004 provides the fore and aft thrust. As shown in FIGS. 6 and 7, the loader chain 2004 is of link and roller type and is shown attached to the saddle cart 2006 and driven by a reversible sprocket 2039 in FIG. 8. This chain 2004 travels in the chain tracks 2052 and 2054 previously mentioned and is prevented thereby from buckling in thrust. The free end 2103 of the chain 2004 is stored in a chain storage track 2008, shown in FIG. 22.

By means, not shown, the chain can accurately stop and hold the saddle cart 2006 at a loading station to receive a lifted missile-booster combination 300. When the aft booster shoe 204 enters the receptacle 2200 of the saddle cart 2006 it is approximately four (4) inches aft of its seated position for transportation. The reverse motion pawl 2005 is pushed up and rests on the top surface of the booster shoe 204. As mentioned, the forward and reverse motion pawls 2007 and 2005, respectively, must now be retracted until the reverse motion pawl 2005 has passed over the top of the aft booster shoe 204 and dropped to engage its aft surface. The ramming operation then takes place.

Several sets of articulated links are required to move the forward and reverse motion pawls 2007 and 2005 with respect to the saddle cart 2006 since both elements are attached to the loader chain 2004. For ease of understanding, the various links and joints of the saddle cart 2006 are analogous to the anatomy of the human leg.

As shown best in FIG. 5, the carriage portion of the saddle cart 2006 is connected to a tie rod crosshead 2204 by two identical tie rods 2202. The saddle cart receptacle 2200 for receiving the aft shoe 204 of booster 200 is centrally located. The coupling link 2106, which secures the saddle cart 2006 to the loader chain 2004, is located to the rear of the crosshead assembly 2204, as shown best in FIG. 1. The forward and reverse motion pawls 2007 and 2005, respectively, fit between the tie rods 2200 and extends fore and aft of the whole assembly of the saddle cart 2006. It should be understood that two separate buckle link systems are used in the saddle cart 2006, one for the rammer-loading operation and one for a cart freeing and chain deceleration absorbing operation at the end travel of the saddle cart 2006. The former system further serves a dual function in that it is also used to precisely locate and hold the booster shoe at the end of a load cycle.

During the ramming operation of the missile-booster combination 300 which will be described first, the tie rod crosshead 2204 holds the saddle cart 2006 rigidly to a hip link 2206 through an auxiliary leg link 2208 and through an auxiliary thigh link 2210, as shown best in FIGS. 1, 9, and 9A. These links 2208 and 2210 are locked in place by a knee latch 2212. The knee latch 2212 projects from the frame support of a floating cam 2214. It is spring-loaded to engage a notch 2209 in the auxiliary leg link 2208.

The other pair of buckling links consists of a thigh link 2205 and a leg link 2207 hinged at a knee joint 2232. The desired buckling movement of this assembly can best be understood by comparing FIGS. 1 and 10. At the loading station position, the saddle cart 2006 is brought to a positive stop by the loader chain 2004. At the thus-located position of the knee joint 2232, a movable short chain track section 2019 is provided, as shown in FIG. 11. This chain track section 2019 is of the same configuration as the loader chain tracks 2052 and 2054 and, in fact, forms a guide path in continuation thereof.

Figure 12:
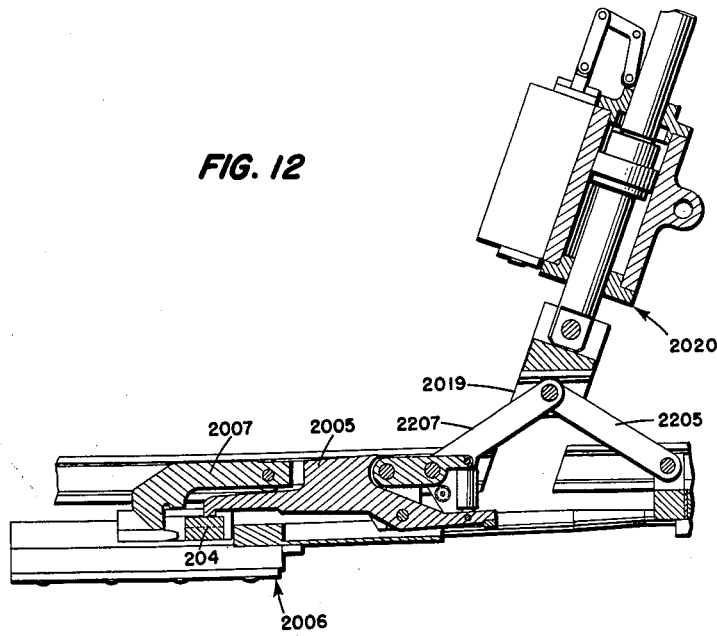
FIG. 12 is a side elevation, partly in cross section, showing the operation of the rammer, with the pawls partly retracted.
Figure 13:
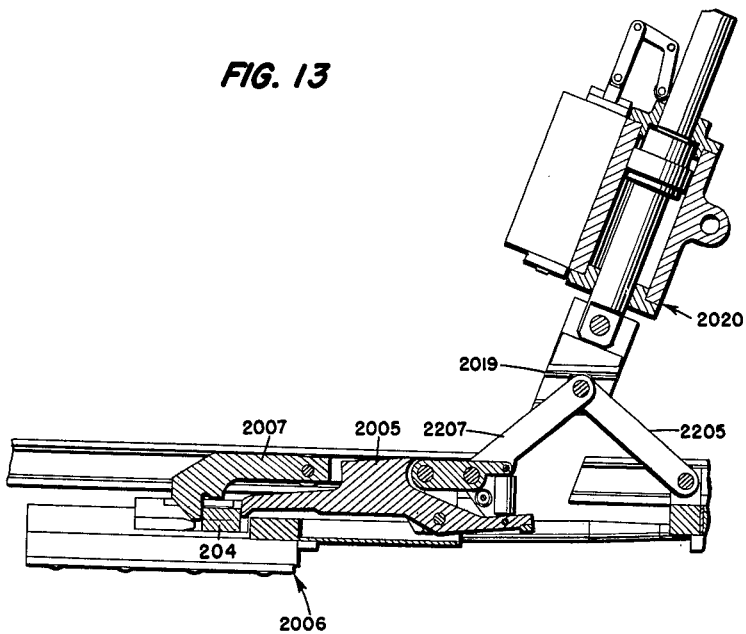
FIG. 13 is a side elevation, partly in cross section, of the rammer, with a pawl dropped behind the aft shoe of the booster.
Figure 14:
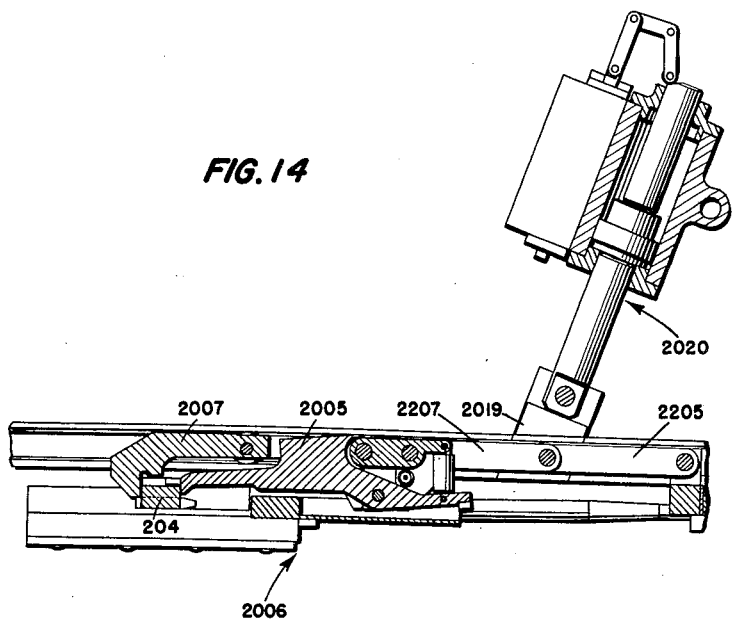
FIG. 14 is a side elevation, partly in cross section of the rammer, with the missile-booster combination rammed forward.
Figure 15:
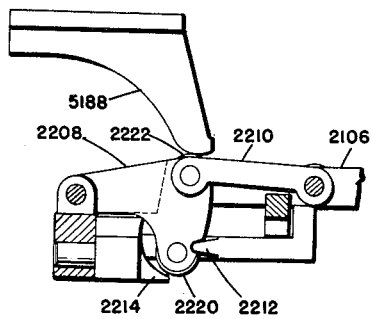
FIG. 15 is a side elevation, partly in cross section, showing stoppage of the saddle cart with said saddle cart being latched to the loader chain nearing the end of travel thereof.
Figure 16:
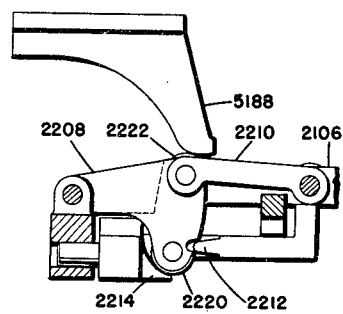
FIG. 16 is a side elevation, partly in cross section, showing the stoppage of the saddle cart with the knee latch being released.
Figure 17:
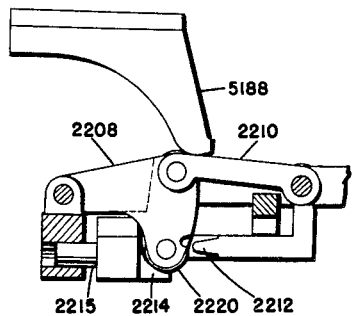
FIG. 17 is a side elevation, partly in cross section showing the stoppage of the saddle cart, with the saddle cart being decelerated.
Figure 18:
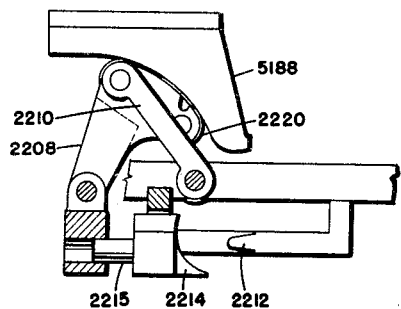
FIG. 18 is a side elevation, partly in cross section, of the saddle cart stopped, with the loader chain overtraveled.

The chain track section 2019 is secured to the hydraulically operated rammer 2020. The rammer 2020 is mounted at an angle from the vertical and the track mating ends of the track section 2019 are cut correspondingly so there will be a rightward motion component in addition to the vertical motion to retain the knee joint 2232 when the section 2019 is lifted, as shown in FIG. 12.

FIG. 11 shows the aft booster shoe 204 initially inserted in the saddle cart 2006. There now remains the rightward horizontal difference, as shown by the arrows, of four (4) inches to its desired final loaded position in the saddle cart 2006. In this present position, the reverse motion pawl 2005 is lifted against spring pressure and rests on the top surface of the aft booster shoe 204.

Both the forward motion pawl 2005 and the rear motion pawl 2007 must be ram-retracted simultaneously rightward by an upward motion of the rammer 2020 until the reverse motion pawl 2007 has passed over the top of the aft booster shoe 204 and dropped to engage its rear surface. The aft booster shoe 204 with the entire missile-booster combination is then rammed by a downward motion of the rammer 2020 four (4) inches leftward to release the missile-booster combination 300 from its handling tray and to seat its aft booster shoe 204 in the saddle cart 2006, as shown by the series of the ramming operation, illustrated in FIGS. 11, 12, 13, and 14.

Thereafter the chain 2004 can pass unobstructed through the short chain track section 2019 to propel the saddle cart 2006 and engaged missile-booster combination 300 onward along the loader track. Further buckling of the links 2205 and 2207 is prevented by the confining action of the chain guides 2052 and 2054.

After the missile-booster combination 300 receives its wings 102 and fins 104 and 208 it becomes a weapon 400 ready for transfer to a launcher. As the cart 2006 with the weapon 400 approach the end of the load cycle, the cart 2006 must be stopped and held while continued forward motion of the drive member transfers engagement of the weapon 400 from the cart 2006 to the launcher.

When the cart is at a point one and one-third inches from stop, a guide bar 2216 of the floating cam 2214 of the saddle cart 2006 contacts a stopping bar 5111 on the launcher, as shown in FIG. 5. During the next five-sixteenths inch of travel, the knee latch 2212 disengages the auxiliary leg link 2208 from its locked position. The auxiliary leg and thigh links 2208 and 2210 buckle (or collapse) at an auxiliary knee joint 2218, as shown best in FIG. 10, and the loader chain 2004 and pawls 2005 and 2007 continue forward to complete the unloading cycle.

The velocity of the loader chain 2004 and the saddle cart 2006 must be offset. Hydraulic means in the drive, not shown, reduce this velocity of the loader chain 2004 and the saddle cart 2006 to a creepage movement in the final phase of the loader chain travel. As the leg link 2208 associated with the saddle cart 2006 unlatches, a secondary roller 2220 contacts the floating cam 2214 of FIG. 9A. This forces the auxiliary leg and thigh links 2208 and 2210 to buckle. The contour of the floating cam 2214 is designed to decelerate the saddle cart 2006 to a complete stop.

As illustrated in FIGS. 15, 16, 17, and 18, a fixed cam 5188 is located at the end of the trunk line to contact a cam roller 2222 of the auxiliary knee joint 2218. In the collapsed position of the auxiliary leg and thigh links 2208 and 2210, the cam 5188 and the pivot point of the auxiliary leg link 2208 are centered. The pivot end of the auxiliary thigh link 2210 is anchored and moves with the chain coupling link 2106. The loader chain 2004 can no longer move the saddle cart 2006 when the auxiliary knee joint 2218 collapses to contact the fixed cam 5188. At this point, the saddle cart 2006 is locked and cannot move regardless of the position of the loader chain 2004.

The roller 2222 of the auxiliary knee joint 2218 moves down the circular cam surfaces when the saddle cart 2006 is retracted. The roller 2222 moves until it reaches the cam radius. The secondary roller 2220 contacts the floating cam 2214. The contour of the floating cam 2214 accelerates the saddle cart 2006 away from the surface stop. The saddle cart 2006 is then accelerated to match the speed of the chain 2004.

In one and one-third inches, the knee latch 2212 locks the auxiliary leg and thigh links 2208 and 2210, respectively, into position and the saddle cart 2006 is coupled to the loader chain 2004. After the auxiliary leg and thigh links 2208 and 2210 are latched, the moving tie rod crosshead 2204, which supports a floating cam guide pin 2215, contacts the stationary floating cam 2214 and carries it away with the loader chain 2004.

The floating cam 2214 is held against the tie rod crosshead 2204 by a pair of floating cam tension springs 2224 during the travel of the loader chain 2004, as shown in FIGS. 1, 9A, 10, and 19, which are hooked to the outer crosshead 2204 and the floating cam guide bar 2216 to urge the guide bar 2216 against the stopping bar 5111, shown best in FIG. 5, when loading the weapon 400 to the launcher.

Figure 19:
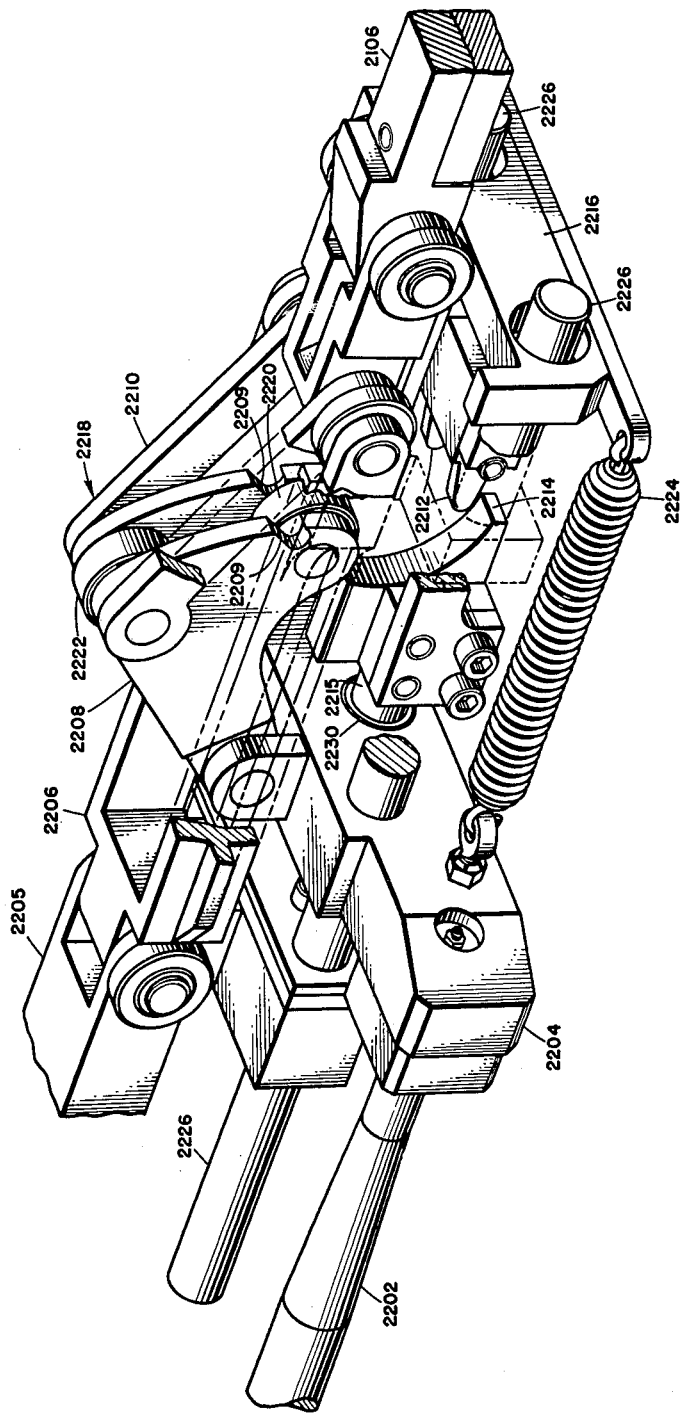
FIG. 19 is a dimetric view, partly broken away, of the saddle cart crosshead assembly after loading of the missile weapon onto the launcher.
Figure 20:
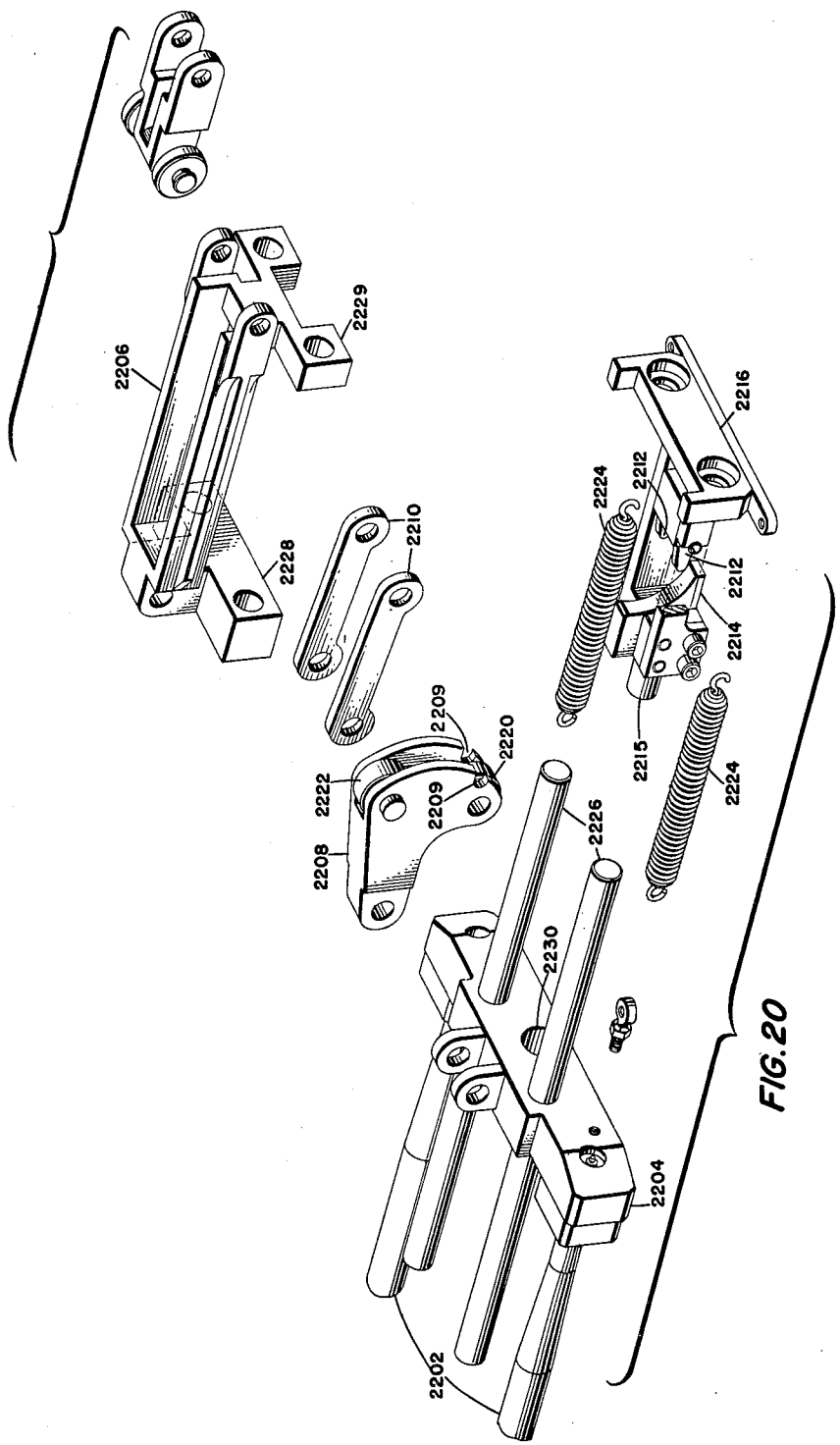
FIG. 20 is an exploded view of the saddle cart crosshead assembly.

FIGS. 19 and 20 show the crosshead assembly and subassemblies in dimetric and exploded views. The tie rod crosshead 2204 is provided with a pair of guide rods 2226, and it is guided thereby into each end of the hip link 2206 by journals 2228 and 2229, shown best in FIG. 20. The floating cam 2214 in assembly with the guide bar 2216 is guided at one end by these two guide rods 2226 and at the other end by the guide pin 2215 slide-fitted into a journal 2230 in the center of the tie rod crosshead 2204, as shown in FIG. 20.

Figure 21:
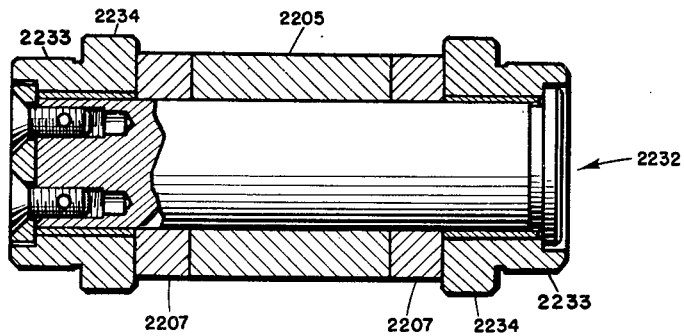
FIG. 21 is a section, partly in elevation, taken lengthwise through a knee joint of the saddle cart.

Referring now to FIG. 21, there is shown a cross section of a knee joint 2232 consisting of two special chain track rollers 2234. Each roller 2234 has a hub extension 2233 designed to act as a cam roller. The chain tracks 2052 and 2054 have clearance for travel of these hub extensions 2233.

Figure 24:
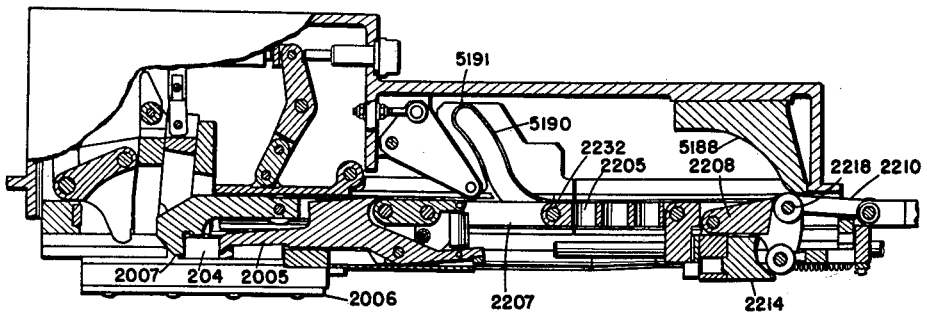
FIG. 24 is a cutaway elevation view, partly in cross section, of the saddle cart at the engaging means on the launcher showing knee joint cam roller engaging the cam surface.

However, there is a cam surface 5190, shown in FIG. 24, located on the launcher which is contacted by the top and bottom of the hub extension 2235. As a result, there is a moment of travel when only the hub extensions 2233 of the special chain rollers 2234 guide the knee joint 2232.

Figure 23:
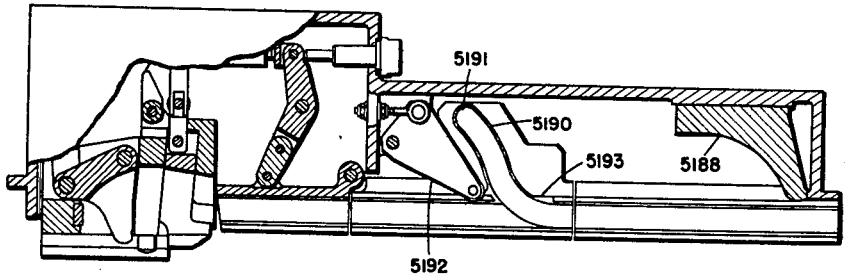
FIG. 23 is a cutaway elevation view, partly in cross section, of engaging means for receiving the saddle cart at the launcher.
Figure 25:
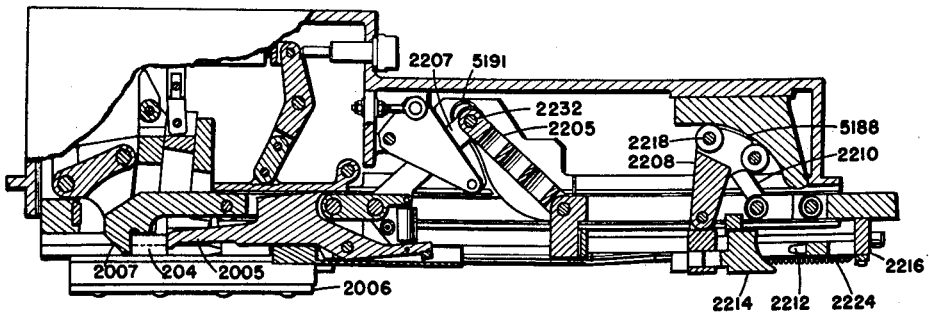
FIG. 25 is a cutaway elevation view, partly in cross section, of the saddle cart at the engaging means on the launcher showing the loader chain in an overtravel position.

As shown in FIGS. 23, 24, and 25, the top of the chain tracks 2052 and 2054 is cut away to provide an open section 5193 and a cam surface 5190 guides the knee joint 2232 out of the chain tracks 2052 and 2054.

Figure 30:
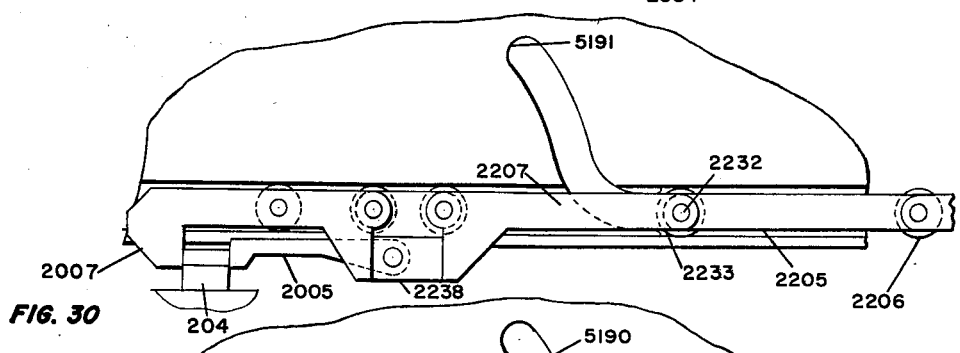
FIG. 30 is a schematic diagram illustrating the start of the knee joint action for terminal positioning of the weapon lug.
Figure 31:
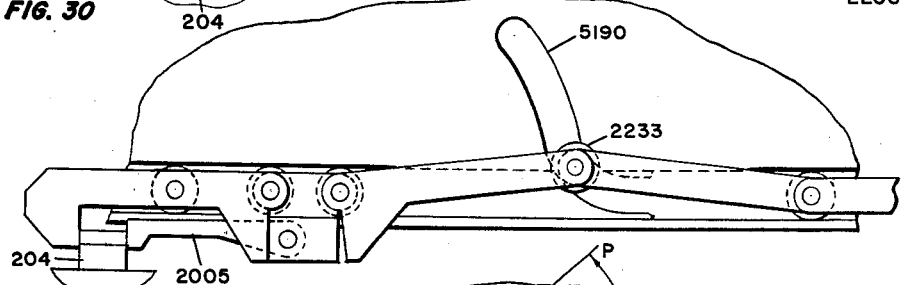
FIG. 31 is a schematic diagram similar to FIG. 30 showing the entry of the knee joint into the terminal position.
Figure 32:
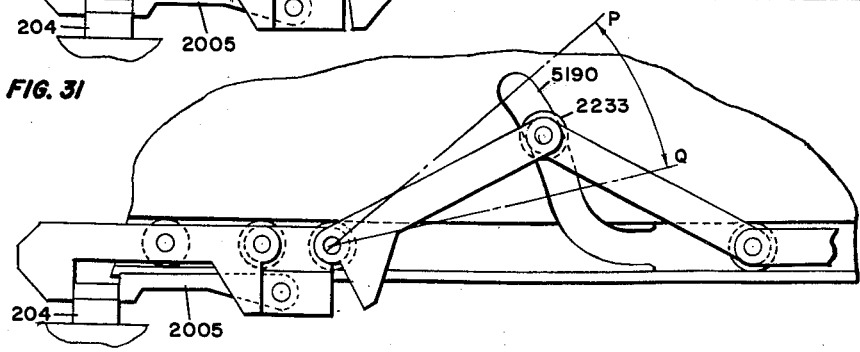
FIG. 32 is a schematic diagram similar to FIG. 30 with sector lines depicting the arc within which the knee joint precisely positions the weapon lug.

FIGS. 30, 31, and 32 show schematically the terminating action of the knee joint 2232 as the weapon is positioned and held on the launcher for subsequent engagement by elements not shown. It will be noted that the cart has been omitted since the action of the linkage and pawls is independent of the cart function.

Figure 29:
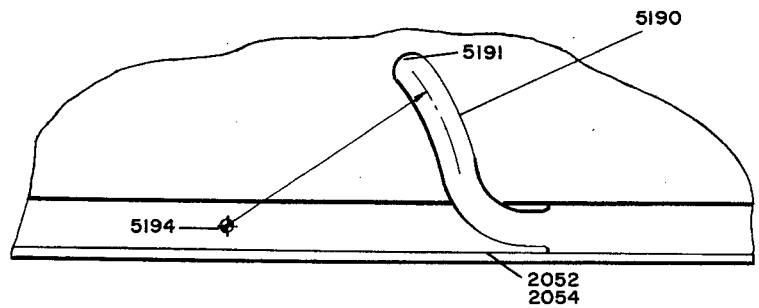
FIG. 29 is a schematic diagram illustrating the geometry of the cam surface.

The guide arm cam surface 5190, shown in FIGS. 24 and 29, has an S-shaped contour consisting of two tangential radial sections or arcs that are inverted in relation to each other and the larger or terminal arc section proximate to a radial end 5191 has an imaginary mean radius center 5194 as noted that is equal to the pitch length of the leg link 2207 shown in FIG. 30. The smaller of the two radial sections is positioned to intercept the forward motion of the hub extension 2233. Following the sequence through FIGS. 30, 31, and 32, the linear travel of the hub extension 2233 is diverted from the confines of the chain track to the radial cam surface 5190 and the pivoting end of the leg link 2207 stops at a position which coincides with the imaginary cam radius center. As long as the hub extension 2233 of the knee joint 2232 is within the confines of the terminal cam section 5190, that is within the arc P—Q, the position of the lug 204 is precisely held and the propelling force acting through the hip link 2206 has no facility for moving the lugged weapon.

In the particular application the power drive control has been adjusted to a nominal 1.5 inch overtravel after the position of the weapon lug 204 has been secured as shown in FIG. 32. The radial arc length P—Q in this case provides for approximately plus or minus 1.5 inches positional accuracy of the stopping position of the extended chain member. Factors that have been considered in determining the total range of overtravel are inherent elasticity of the extended chain which is subjected to tension and compression loads, accumulated backlash in the plural number of chain links, flexure of the ship's structure in heavy seas, temperature expansion, and positional accuracy of the power drive.

It has been related how a section of the chain tracks 2052 and 2054 is cut away to provide the open section 5193 which allows the knee joint 2232 to collapse. There are three sets of chain rollers 2235, 2236, and 2237 forward of the knee joint 2232 which pass through thic cutout section 5193. Connections between the foot link or forward motion pawl, ankle, and leg links 2007, 2238, and 2207, respectively, have a rigid back feature.

The longitudinal surfaces of these links 2007, 2238, and 2207 together form a horizontal plane. The leg link 2207 and foot link or pawl 2007 can fold up but not down. Two sets of rollers 2236 and 2237 remain in the chain tracks 2052 and 2054 while passing through the open section 5193. A retainer 5192, shown in FIG. 23, is located on the launcher which retains the forward foot link rollers 2235 and 2236 after they pass through the open section 5193.

Figure 10:
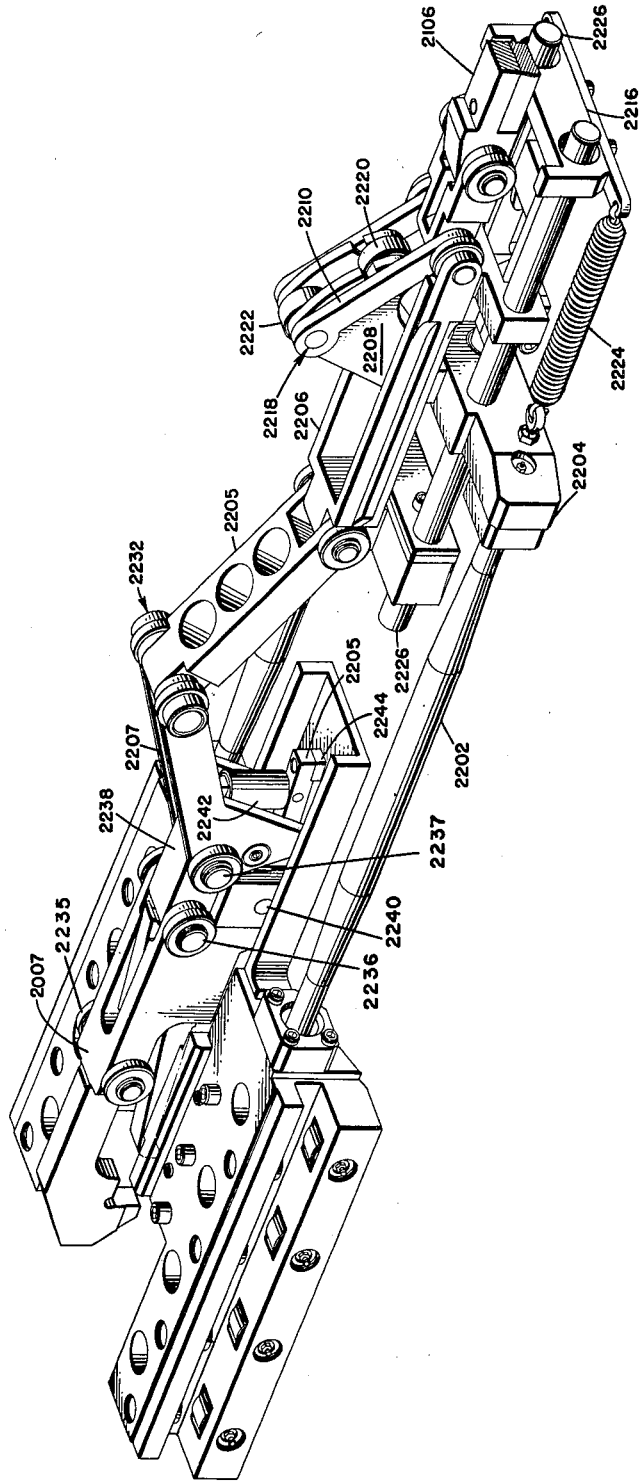
FIG. 10 is a dimetric view illustrating position of the saddle cart and loader chain linkage arrangement after loading of the missile weapon onto a launcher.
Figure 11:
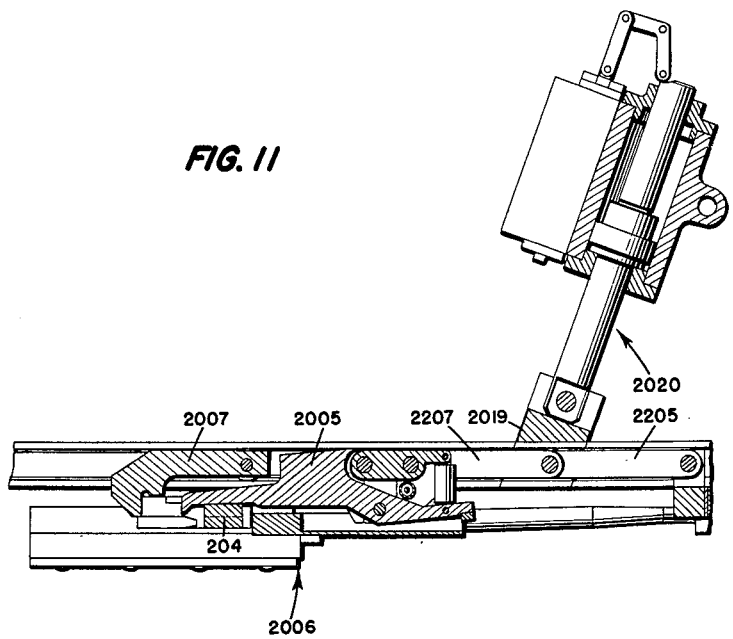
FIG. 11 is a side elevation, partly in cross section, showing the operation of the rammer with the missile-booster combination hoisted and the aft shoe entered in the saddle cart receptacle.

As shown in FIG. 10, an ankle link 2238 has a pivot pin 2240 for the reverse or aft motion pawl 2005. This pivot pin 2240 is dropped below the chain track level. Since the reverse or aft motion pawl 2005 can pivot freely at the pin 2240, a tension spring 2242 between the link 2238 and the reverse or aft motion pawl 2205 holds the forward end of the pawl 2005 down during the load cycle of the missile-booster combination 300 and weapon 400. A safety stop 2244 is provided to limit the lift of the reverse or aft motion pawl 2005. As shown in FIG. 26, the saddle cart 2006 is in the normal load position. In FIG. 27, the missile-booster combination 300 is retained by the reverse or aft motion pawl 2005 if for some reason, such as vertical mechanical shock, the pawl 2005 is raised.

The safety stop 2244 contacts a surface 2246 on the rear end extension of the saddle cart 2006. In FIG. 28, the aft booster shoe 204 is shown entering the receptacle 2200. Because of the safety stop 2244, the forward end of the reverse or aft motion pawl 2005 will not raise to clear the top of the aft booster shoe 204 when the rammer 2020 retracts the pawl.

Inasmuch as the saddle cart 2006 is stationary when the rammer 2020 is retracted, the reverse motion pawl 2005 must retract the distance indicated between the arrows before the safety stop 2244 clears the rear of the surface 2246.

The ram stroke of the rammer 2020 is nominally four (4) inches. During successive load cycles of the missile-booster combinations 300, however, this dimension can vary. A variation of plus or minus one-half inch is provided for. The insets of FIG. 28 show the nominal position of the aft booster shoe 204 and its position at the two extremes. It is to be noted how the arrow dimensions shown therein must match or be greater than the arrowed overlap of the safety stop 2244 and the surface 2246 before the reverse or aft motion pawl 2005 is permitted to lift.

Obviously many modifications and variations of the present invention are possible in light of the above teachings. It is, therefore, to be understood that within the scope of the appended claims the invention may be practiced otherwise than as specifically described.

What is claimed is:

1. In combination, a conveyor system having a tramway with a rail, a carriage received within said rail for traveling on said rail, a crosshead, said carriage being connected to said crosshead, means including a drive chain pivotally connected to said crosshead for moving said carriage in either direction along said rail, a receptacle seating means in said carriage for receiving and carrying an element of an article to be transported by said carriage along said rail, and means including a double pawl toggle vertically spaced and in operative agreement with said receiving and seating means linked to said crosshead and arranged to engage or disengage at a loading station said element of said article being transported by said carriage.

2. In a conveyor system having a tramway with a rail, a carriage received within and arranged to travel on said rail, a crosshead, said carriage being connected to said crosshead, means including a drive chain pivotally connected to said crosshead for moving said carriage in either direction along said rail, a receptacle receiving and seating means in said carriage for carrying an element of an article to be transported by said carriage along said rail, and toggle linkage means having a double pawl at one end thereof and having its other end pivotally connected to said crosshead, said double pawl being vertically spaced and in operative agreement with said receiving and seating means for engaging by a vertical longitudinal movement said element of said article to hold it in position in said receptacle receiving and seating means while said article is being transported by said carriage on said rail.

3. In a conveyor system having a tramway with a first pair of spaced tracks, a carriage received within and arranged to travel on said first pair of spaced tracks, a crosshead, said carriage being connected to said crosshead, a second pair of spaced tracks encompassed by said first pair of spaced tracks, a drive chain contained within said second pair of spaced tracks so as to prevent said chain from buckling while moving said carriage in either direction along said first pair of spaced tracks, said drive chain being pivotally connected to said crosshead for moving said carriage, a receptacle receiving and seating means in said carriage for supporting an element of an article to be transported by said carriage along said first pair of spaced tracks, and means including a double pawl being in operative agreement with said receiving and seating means linked to said crosshead and at a loading station arranged to engage or disengage forward and aft surfaces of said element of said article being transported by said carriage along said first pair of spaced tracks.

4. In the conveyor system as recited in claim 3, wherein said drive chain has terminating spaced ends and consists of a plurality of pivotally connected links.

5. In the conveyor system as recited in claim 4, and motor means including a sprocket engageable with said link drive chain for moving said drive chain within said second pair of spaced tracks.

6. In the conveyor system as recited in claim 4, and toggle type linkage having one end connected to said double pawl and the other end pivotally connected to said crosshead for engaging or disengaging said double pawl with said element of said article being transported at said loading station.

7. In the conveyor system as recited in claim 6, wherein said toggle type linkage includes a pair of intermediate links pivotally connecting said crosshead to said double pawl and having an articulated joint therebetween, and means for moving said joint substantially transversely to the longitudinal axis of said chain so as to buckle said intermediate links at a predetermined location definitive of the desired release as well as capture position of said double pawl.

8. In the conveyor system as recited in claim 3, and additionally spaced sets of horizontally and vertically mounted rollers on said carriage for providing lateral as well as vertical stabilization of said carriage while moving with said article along said first pair of spaced tracks.

9. In combination, a carriage for traveling on a rail, a crosshead, said carriage being connected to said crosshead, a drive chain pivotally connected to said crosshead for moving said carriage through said crosshead along said rail, a receptacle receiving and seating means in said carriage for supporting an element of an article to be transported by said carriage when moving along said rail, and means including a double pawl vertically spaced from said receiving and seating means in operative agreement therewith and having a toggle being linked to said crosshead, said pawl for engaging and disengaging at a loading station the element of the article to be transported by said carriage.

10. A carriage, a crosshead, said carriage being connected to said crosshead, a drive chain pivotally connected to said crosshead for moving said carriage, a receptacle receiving and seating means in said carriage for engaging and supporting an element of an article to be transported by said carriage, and means including a double pawl toggle linked to said crosshead and means for moving said toggle at a predetermined location to engage and hold said element of said article in said receptacle receiving and seating means while said article is being transported by said carriage.

11. In combination, a conveyor having a tramway with a rail, a carriage mounted for movement on said rail, a receptacle in said carriage for receiving an element of an article to be transported by said carriage along said rail, a crosshead, a double pawl engaging with said element of said article, linkage including a pair of intermediate links, one end of said linkage being pivotally connected to said crosshead and the other end to said double pawl, said pair of intermediate links having an articulated joint therebetween, a drive chain pivotally connected to said crosshead, auxiliary linkage having an auxiliary articulated joint with one end of said auxiliary linkage being connected to said crosshead and the other end of said auxiliary linkage pivotally being connected to said drive chain, and longitudinally movable cam means carried by said crosshead for engaging said auxiliary joint and arranged to move said auxiliary articulated joint substantially transversely to the longitudinal axis of said chain so as to buckle said auxiliary linkage and decelerate said carriage and chain substantially at the end of travel thereof.

12. A conveyor system having a tramway with a rail, a carriage mounted for movement on said rail and having a receptacle in said carriage for receiving an element of an article to be transported by said carriage along said rail, a crosshead, a double pawl engaging with said element of said article, linkage including a pair of intermediate links, one end of said linkage being pivotally connected to said crosshead and the other end to said double pawl, said pair of intermediate links having an articulated joint therebetween, a drive chain pivotally connected to said crosshead, auxiliary linkage including a second pair of intermediate links, one end of said auxiliary linkage being connected to said crosshead, the other end of said auxiliary linkage being pivotally connected to said drive chain, said second pair of intermediate links having an auxiliary articulated joint therebetween, and means carried by said crosshead for engaging said auxiliary articulated joint and arranged to move said articulated joint substantially transversely to the longitudinal axis of said chain so as to buckle said intermediate links and decelerate said carriage and chain substantially at the end of travel thereof.

13. In a conveyor system having a tramway with a rail, a saddle cart mounted for movement on said rail and arranged to receive an element of an article to be transported by said saddle cart along said rail, a double pawl engaging with said element of said article, a drive chain, a pair of links having an articulated joint therebetween, one of said links being connected to said chain and the other end to said saddle cart, and means carried by said saddle cart for engaging and moving said articulated joint substantially transversely to the longitudinal axis of said chain so as to buckle said links and decelerate said saddle cart with respect to said chain at substantially the end of travel thereof.

14. In the conveyor system as recited in claim 13, and said means for guiding said joint to unbuckle said links and accelerate said saddle cart with respect to said chain during reverse travel of said chain in the opposite direction.

References Cited in the file of this patent

UNITED STATES PATENTS

| 1,942,247 | Johnson | Jan. 2, 1934 |
| 2,985,072 | Carlberg et al. | May 23, 1961 |

FOREIGN PATENTS

| 10,849 | Great Britain | 1911 |